United States Patent
Brady, Jr. et al.

(10) Patent No.: US 7,114,171 B2
(45) Date of Patent: Sep. 26, 2006

(54) METHOD FOR CONTROLLING AN IN-FLIGHT ENTERTAINMENT SYSTEM

(75) Inventors: Kenneth A. Brady, Jr., Trabuco Canyon, CA (US); Dominique Van Rafelghem, Irvine, CA (US); Lyle K. Norton, Irvine, CA (US)

(73) Assignee: Thales Avionics, Inc., Edison, NJ (US)

( * ) Notice: Subject to any disclaimer, the term of this patent is extended or adjusted under 35 U.S.C. 154(b) by 0 days.

(21) Appl. No.: 10/145,464

(22) Filed: May 14, 2002

(65) Prior Publication Data

US 2003/0217363 A1    Nov. 20, 2003

(51) Int. Cl.
- H04N 7/18 (2006.01)
- G06F 9/46 (2006.01)
- G06F 3/00 (2006.01)
- H04N 7/173 (2006.01)

(52) U.S. Cl. ............................. 725/77; 725/75; 725/76; 725/82; 725/87; 718/105; 719/311

(58) Field of Classification Search ............ 725/75–77, 725/82, 87, 114, 91–93, 138; 719/311; 718/105
See application file for complete search history.

(56) References Cited

U.S. PATENT DOCUMENTS

| | | | |
|---|---|---|---|
| 3,795,771 A | 3/1974 | Gundersen et al. | |
| 4,774,514 A | 9/1988 | Hildebrandt et al. | |
| 4,866,515 A * | 9/1989 | Tagawa et al. | 358/86 |
| 4,887,152 A * | 12/1989 | Matsuzaki et al. | 725/76 |
| 4,896,209 A * | 1/1990 | Matsuzaki et al. | 725/12 |
| 5,568,484 A * | 10/1996 | Margis | 370/452 |
| 5,761,673 A * | 6/1998 | Bookman et al. | 719/311 |
| 5,835,127 A * | 11/1998 | Booth et al. | 725/76 |
| 5,848,367 A * | 12/1998 | Lotocky et al. | 701/36 |
| 5,854,591 A * | 12/1998 | Atkinson | 725/76 |
| 5,896,129 A * | 4/1999 | Murphy et al. | 345/327 |
| 5,973,722 A | 10/1999 | Wakai et al. | |
| 6,014,381 A * | 1/2000 | Troxel et al. | 370/395.52 |
| 6,018,764 A * | 1/2000 | Field et al. | 709/217 |
| 6,034,688 A | 3/2000 | Greenwood et al. | |
| 6,047,127 A | 4/2000 | McCarten et al. | |
| 6,058,288 A | 5/2000 | Reed et al. | |
| 6,064,420 A * | 5/2000 | Harrison et al. | 725/136 |
| 6,148,253 A | 11/2000 | Taguchi et al. | |
| 6,177,887 B1 | 1/2001 | Jerome | |
| 6,249,913 B1 * | 6/2001 | Galipeau et al. | 725/76 |
| 6,266,815 B1 | 7/2001 | Shen et al. | |
| 6,289,378 B1 * | 9/2001 | Meyer et al. | 709/223 |

(Continued)

Primary Examiner—Chris Kelley
Assistant Examiner—Son P. Huynh
(74) Attorney, Agent, or Firm—Gardner Carton & Douglas LLP

(57) ABSTRACT

A method for controlling an in-flight entertainment (IFE) system using network protocols, such as TCP/IP, HTTP, or FTP. Control of a plurality of functions, including in-seat and broadcast audio and video, overhead reading light control, and flight attendant call, are implemented using a network client, a network server, and a network server program, each communicating with network protocols. The network client may be visible or invisible to a user of the in-flight entertainment system, depending on whether a web browser or a virtual web browser is used as a network client. The software for each line replaceable unit (LRU) may be designed, redesigned, or tested independently from other components within the IFE system. Particular functions of the IFE system can be made available only to particular parts of the IFE system, allowing different levels of access to the IFE system for different passenger classes.

50 Claims, 9 Drawing Sheets

U.S. PATENT DOCUMENTS

| | | | |
|---|---|---|---|
| 6,308,205 B1 * | 10/2001 | Carcerano et al. | 709/221 |
| 6,526,580 B1 * | 2/2003 | Shimomura et al. | 725/63 |
| 6,598,227 B1 * | 7/2003 | Berry et al. | 725/77 |
| 6,813,777 B1 * | 11/2004 | Weinberger et al. | 725/76 |
| 2002/0059614 A1 * | 5/2002 | Lipsanent et al. | 725/75 |
| 2002/0129100 A1 * | 9/2002 | Dutta et al. | 709/203 |
| 2002/0170060 A1 * | 11/2002 | Lyman | 725/73 |
| 2002/0184624 A1 * | 12/2002 | Spencer | 725/39 |
| 2003/0009761 A1 * | 1/2003 | Miller et al. | 725/76 |
| 2003/0046701 A1 * | 3/2003 | O'Donnell | 725/76 |

* cited by examiner

METHOD FOR CONTROLLING AN IN-FLIGHT ENTERTAINMENT SYSTEM

FIELD OF THE INVENTION

The invention generally relates to computer networks, and more particularly relates to a system and method for controlling and operating an in-flight entertainment system using network protocols.

BACKGROUND OF THE INVENTION

Most commercial aircraft today are equipped with an IFE system. Typically, an IFE system includes a plurality of computers, which are connected to provide various functions. These computers include, for example, audio/video head-end equipment, area distribution boxes, passenger service systems (PSS), and seat electronic boxes. In the modular environment of an aircraft, each of these computers is referred to as a line replaceable unit ("LRU") since most are "line fit" on an assembly line when an aircraft is built and tested. At least some of the LRUs are connected directly to passenger seats, either individually or by seat groups. These LRUs are the interface between passengers on an aircraft and the IFE system, and provide access to a plurality of functions. A more sophisticated, multi-functional IFE system may include close to a thousand separate connected computers working together to perform the plurality of functions of the IFE system.

The LRUs within a conventional IFE system typically include relatively simple electronics and microprocessors for performing system functions. The channel and volume of the audio provided to a seat are conventionally controlled by a seat electronics box serving a group of seats, the seat electronics box including a microprocessor and signal conditioning electronics to handle audio/video input signal. In some known systems, the seat electronics box can be overridden by the cabin announcement system to allow for flight crew to interrupt audio or video with safety announcements for the passengers. IFE systems must meet strict requirements set by the Federal Aviation Administration (FAA) for avoiding interference with safety critical flight electronics in the cockpit and elsewhere on board. In addition, the aircraft industry has set strict requirements on IFE systems, for example, on the power use, bandwidth, and weight of an IFE system. An IFE system provider is severely restricted in choosing particular hardware and software components for these reasons.

Methods and systems for controlling an IFE system have typically been implemented with software instructions executed in a "master-slave" architecture. Specific functions for the master-slave system have been implemented with proprietary, application specific, and custom software. Electronics used for more complex functions of the IFE system have typically included computers with microprocessors and memory. Custom software has been required for each master and slave computer, and for each function to be performed. Each piece of custom software must be integrated and tested within the system separately. For even the simplest function to be performed, integration and testing is labor intensive and error-prone.

Custom software has conventionally been used, for example, to implement a cabin management terminal, which interacts with other hardware such as tape players, digital media players, or game consoles. Each of the interfaces between the management terminal and the other devices within the IFE system has been programmed and tested separately. For each piece of hardware implemented within the IFE system, one interface (for example, the interface between a master computer and a particular type of slave computer) must be defined, and two software programs must be developed and tested (one for the master and one for the slave). If additions or changes to the system are later desired, such changes are time consuming and require a high degree of familiarity with the details of the original system design.

Attempts have been made to speed up design, testing, and maintenance of a conventional IFE system by combining software components that otherwise would have been separate, or by using software components designed for one device with a different device. Unfortunately, such efforts have resulted in a larger number of system errors and software bugs, and those software bugs have been more difficult to fix since the effects of changes to the software are more difficult to predict when the software runs on multiple types of hardware within the system.

Furthermore, due to the custom nature of the software in conventional IFE systems, as newer models of a system are developed, it becomes difficult for a system provider to support its legacy models. Engineers who designed older models may have left the system provider, and new engineers may not have the time or ability to learn how the older system was implemented. Diagnosing and fixing bugs in a system with a proprietary hardware and software architecture requires time and effort simply to learn how the system works. Maintenance resources are often wasted teaching new engineers how a highly proprietary system works.

A need, therefore, exists for an IFE system that has an architecture that is simple to implement, modify, diagnose, more modular, and easier to interconnect.

SUMMARY OF THE INVENTION

The present invention provides an improved system and method for controlling an IFE system that overcomes the foregoing problems by using a network client, such as a web browser or a terminal emulation program, and a network server program, such as a CGI script running on a network server, such as a web server, each located on one or more LRUs, to perform a function of the IFE system. The network client and server communicate using one or more network protocols, such as Transmission Control Protocol (TCP), User Datagram Protocol (UDP), Hyper Text Transfer Protocol (HTTP), or File Transfer Protocol (FTP).

According to an aspect of the invention, functions of the IFE system are performed after a network server request, for example, a Uniform Resource Locator (URL) call in the HTTP format, is sent from a web browser to a web server located on either the same or a different LRU. The web server runs a network server program, such as a Common Gateway Interface (CGI) script, using information in the network server request. The functions controlled include in-seat audio and video, flight attendant call, and overhead light switching. An important advantage of the present invention is that the addition or modification of functions in the IFE system is greatly simplified; each function may be implemented independently as a separate web site on the web server.

In an embodiment, the present invention provides a network protocol enabled IFE system. A user interface is provided within the system for enabling a user of the IFE system to generate an input signal. The user interface is connected to one or more LRUs within the system. A processor is located within an LRU, and is used within the system for processing the input signal in order to generate a control activation signal. The control activation signal is received by a network client, which is, in an embodiment, a web browser, and the network client generates a network server request from the control activation signal. A network server program, which is, in an embodiment, a CGI script running on a web server, such as an APACHE TOMCAT server, receives the network server request and controls a function of the IFE system by executing one or more instructions on one or more LRUs in the IFE system. The network server program may optionally return a network server response to the network client when the function is performed. Depending on whether the network client has a full display (i.e., if the network client is a web browser rather than a virtual web browser), the network server response may also be processed for display and displayed.

In different embodiments of the present invention, the functions of the IFE system controlled may be either simple or complex. A complex function of the IFE system is distribution of in-seat audio and video. In some embodiments or modes of operation, the in-seat audio and video distribution is interactive, or is controlled by a crew member through another user interface connected to the system, such as a management terminal. Other complex functions of the IFE system include accessing web pages on the Internet, sending and receiving electronic mail, playing computer games alone or with other users of the system, and checking flight information, such as estimated time of arrival, airspeed, and location. Simpler functions of the IFE system include functions traditionally associated with the passenger service system (PSS), such as flight attendant call buttons, or overhead light buttons. Other simple functions can include seat adjustment, and climate control. As will be recognized by those of ordinary skill in the art, other functions, both simple and complex, are possible.

An important advantage of the present invention is that a user interface within the IFE system does not need to have a display, and a user of the system of the present invention may generate an input signal for a network client without using a display. A user interface may be any mechanical device that can be used to produce an input signal for the system, such as a switch, button, or knob; in this embodiment, the user interface may not have a display. This advantage is accomplished through the use of a virtual web browser. As used hereinafter in a description of the present invention, a "virtual web browser" is a web browser that is capable of receiving a control activation and of producing a network server request, such as a URL call, is capable of receiving a network server response, and is capable of parsing the network server response, which might be a web page in HTML format, into data that is useful to software and hardware components on an LRU that is running the web browser; the virtual web browser does not, however, produce a graphical user interface (GUI), and a GUI is not necessary for a virtual web browser to carry out the steps in the method of the present invention associated with a network client. A user interface connected to a virtual web browser may provide a minimal display, such as a Light Emitting Diode (LED), or no display at all.

In another embodiment, the user interface may include a display and a keyboard. A laptop with a network client can serve as a user interface to the IFE system. (This embodiment is particularly advantageous for purposes of development, testing, and maintenance of an IFE system.) In other embodiments, the user interface could be a touch-screen display. In all of these embodiments, a network client, such as a typical web browser, can be used for performing the steps of the method associated with a network client. As will be recognized by those of ordinary skill in the art, a plurality of different kinds of user interfaces may be used to generate an input signal for the system.

In yet another embodiment of the present invention, communications between the network client and the network server follow TCP/IP protocols, such as the HTTP protocol. In other embodiments, communications within the system might follow a different network protocol, such as FTP, Simple Mail Transfer Protocol (SMTP), TELNET, or Wireless Application Protocol (WAP). As will be recognized by those of ordinary skill in the art, secure network protocols, such as Secure Sockets Shell (SSH) or Secure HTTP (HTTPS) could also be used within the system of the present invention.

The network client and the network server need not be located physically on the same LRU within the system. In one embodiment, the network client and the network server are both loaded onto hardware on the same LRU. In another embodiment, the network client program loaded on a first LRU communicates (following a network protocol) with the network server on a second LRU within the system. It is also possible, within the system of the present invention, for several network server programs to run simultaneously on the same network server, communicating with more than one network client at the same time. The number of network server programs that may run simultaneously is limited primarily by the network server and by the hardware resources of the LRU running the network server. Another important advantage of the present invention is that a remote LRU with greater hardware resources may be selected for having a network server and a network server program, as opposed to an LRU with fewer hardware resources that is local to the LRU on which instructions must be executed in order for a function of the IFE system to be controlled. The IFE system of the present invention is more flexible and modular as a result.

The present invention also provides a method for performing a function of an IFE system using network protocols. The method begins with generating an input signal with a user interface. As described above, the user interface that is used to generate the input signal can be a simple switch, a keyboard, a touch-screen, a laptop, or any other suitable input device.

The input signal generated by the user with the user interface is processed by a processor, producing a control activation signal. The processing in this step is also called key processing, and allows for a simple analog or digital signal (whatever signal is generated by the user interface in the first step) to be translated into a control activation signal, which is useful to a network client program. In an embodiment, the processing in this step is performed by a combination of hardware and software (such as a device driver) on a first LRU within the IFE system. The control activation signal produced is specific to a particular input generated with the user interface.

The method allows a function of the IFE system to be controlled. Using the control activation signal, the network client generates a network server request. The network server request is sent to a network server. Upon receipt of the network server request, the network server runs a network server program, which executes one or more instructions on one or more LRUs within the IFE system associated with controlling a particular function of the IFE system. The function controlled depends on the form of the network server request, which depends on the form of the control activation signal, which depends on the form of the input signal. Optionally, the network server program may also generate a network client response with information associated with the function controlled. Other optional additional steps that may be implemented in an embodiment of the present invention include sending the network client response to the network client, processing the network client response for display, and displaying of the processed network client response.

As described above, the method of the present invention may be any of a plurality of network protocols, such as HTTP, FTP, SMTP, or TELNET. In a preferred embodiment of the present invention, the HTTP protocol is used, and the network server request is generated in HTTP format. In other embodiments of the present invention, the network server request, the network client response, or both can be provided in a different format, such as the FTP format. Those of ordinary skill in the art will recognize that other network protocols may be used for communication between LRUs within the IFE system.

An advantage of the present invention is that it avoids a need for complex software communication interfaces within an IFE system, and the time and effort required for making additions or changes to the IFE system is thereby reduced. In particular, through the use of standard software technology, interface definitions, and protocols, development is considerably simplified. Advantageously, the extensive use of TCP/IP to communicate among system components allows for each function of the IFE system to be designed and tested independently before being integrated with the system. As a result, each piece of hardware within the IFE system can be tested separately, improving the reliability of the system by designing and testing each network server program separately.

Another advantage of the present invention is that it reduces the hardware needed in the aircraft cabin, saving weight. For example, by using network commands to control the PSS components, physical switches are not necessary for the reading light and attendant call functions. All of the functions of the IFE system might be performed by a user interface with a keyboard and display or touch-screen accessible to a passenger, a crew member, or both.

According to an embodiment of the present invention, the network server program executes instructions on LRUs within the IFE system in order to control functions, and optionally provides a network server response to the network client. The network server program is implemented, in an embodiment, with a Common Gateway Interface (CGI) script. As is known to those of skill in the art, CGI scripts can be written using a variety of different programming languages, such as Practical Extraction and Reporting Language (PERL) scripts, Java Scripts, or with C, C++, or Java. In the presently preferred embodiment of the invention, the network client program is a web browser that accesses the CGI script by sending a network server request in the form of an HTTP formatted URL call to the LRU on which the network server program (in this case, a CGI script) is loaded. As is known to those of ordinary skill in the art, other programs written in other programming languages might be used to implement the various high-level and low-level functions of the IFE system. It is not necessary to the present invention that CGI scripts be used to implement a network server program. A network server program might also be implemented with Java Servelets (JSPs), or following the Simple Object Access Protocol (SOAP). Furthermore, the network client may be used by the network server program for executing particular instructions for controlling some functions of the IFE system. In such embodiments, the network client may be a Java Applet or Java Script.

An obstacle to would-be developers of a network protocol enabled IFE system lies in the adaptation of normal web browsers and web servers to the special functions of an IFE system. Conventionally, communication between a web browser and a web server is initiated by a user, and the web browser merely displays the words or pictures associated with a particular HTTP address. The web server responds to HTTP requests triggered by the user when the user clicks on a link. Without user input, the web server and web browser typically do not communicate with each other. In an IFE system, however, it is not always desirable for users to be required to generate an input signal before the function is performed.

In yet another embodiment, the present invention overcomes this obstacle through the implementation of a limited function "virtual" web browser. In embodiments of the present invention in which the user interface does not include a display, the network client program is a virtual web browser. The virtual web browser performs the same functions of parsing Hyper Text Markup Language (HTML) and generating URL calls, but does not display a web page to a user, as a traditional web browser does. In some embodiments, the network client may be a virtual web browser with a minimal display (such as a light emitting diode, array of light emitting diodes, or small liquid crystal display) rather than no display at all. A virtual web browser has the same ability of a conventional web browser to parse HTML or Extensible Markup Language (XML) files sent to it by a web server, and is generally substantially similar to a normal web browser except in those respects already described.

Within a network protocol enabled IFE system, new functions are implemented by engineers as independent web pages with separate program files. This greatly reduces the risk of unintended interactions and side effects, which have plagued conventional IFE systems. In addition, in an embodiment, system functions are only accessed upon network server requests from the network client, and such functions may be suspended or terminated when the function is completed. This conserves the resources of the IFE system, allowing new functions to be introduced with less impact on the system as a whole. The flexibility and modularity of a network protocol enabled IFE system presents a great advantage over conventional methods and systems.

Another notable advantage of the system and method of the present invention is that typical software engineers, who are already familiar with the network protocols, are able to diagnose and fix problems within the system more quickly. The learning curve associated with the custom software of a traditional IFE system is eliminated. This avoids wasted time and effort associated with development, testing, and maintenance. System testing is performed with the method described above using a laptop, desktop, or personal digital assistant (PDA) computer as a user interface to the IFE system under development. Each of the functions of the system is tested, for example, by making URL calls from a web browser running on the laptop, desktop, or PDA computer. The laptop runs the network client that is loaded onto computers within the IFE system; accordingly, the laptop, desktop, or PDA computer loaded with the network client program, such as a web browser, can access, exercise, and verify each of the functions of the IFE system. The method of the present invention advantageously eliminates a need to have the entire IFE system running in order to perform diagnostics.

The system and method of the present invention also allow for control of particular functions of the IFE system to be restricted to particular user interfaces. This presents an advantage in that the control of some functions of the IFE system may be made available only to particular users or groups of users. For example, in an embodiment, only user interfaces connected to LRUs in the first class section of the aircraft may be allowed Internet access through the IFE system.

The present invention makes significant use of web services for both passenger and cabin, maintenance and engineering crew usage. From a passenger's perspective, the web is either invisible, as when Passenger Control Units (PCUs) are used, or visible, as when Personal Digital Gateways (PDGs) are used. In the invisible case, button presses on the PCU are translated into control activation signals of invisible controls on an invisible web page by a virtual web browser. These control activation signals cause the appropriate HTTP commands to be emitted, which in turn involve appropriate network server activity. The network server program then causes the needed action to occur based on the specific PCU button originally pressed by the passenger (such as channel surfing, reading light activation, etc).

For PDGs, which incorporate a low resolution touch-screen, web pages are visible to the passenger and activation of on-screen controls causes similar HTTP commands to be emitted and acted on by the appropriate network server. Each page can link to other pages, each one generated by a network server appropriate to the particular function of the IFE system controlled. For example, a page showing available in-seat movies would come from a digital server unit, whereas a page for channel changing might be generated by the passenger's own seat electronics box.

For cabin, maintenance, and engineering crews, access to, and visibility of, the IFE system is through the management terminal (or alternately through a connected laptop when a management terminal is not present). The PC-based unit provides high-resolution touch-screen access to web browser-presented web pages that permit control of entertainment, maintenance and engineering functions, including control of entertainment services.

At each point within the system of the present invention where there is human interaction, there is a web browser. This interaction can be with either passengers or airline crew. The web browser converts human actions (button presses, mouse clicks, touch screen activations) into web server requests. The web server performs requested actions, retrieves data and returns an updated page to the browser. The web servers reside on any LRU that can be externally commanded to perform a function. The web browser can be assisted by Java Applets or JavaScripts; the web server can likewise be assisted by CGI and Java programs. These assistants permit interaction with hardware components, database access and other functionality.

BRIEF DESCRIPTION OF THE DRAWINGS

The foregoing and other objects, advantages, and features of the present invention will be apparent from the following detailed description and the accompanying drawings, in which.

DETAILED DESCRIPTION OF THE INVENTION

Figure 1A:
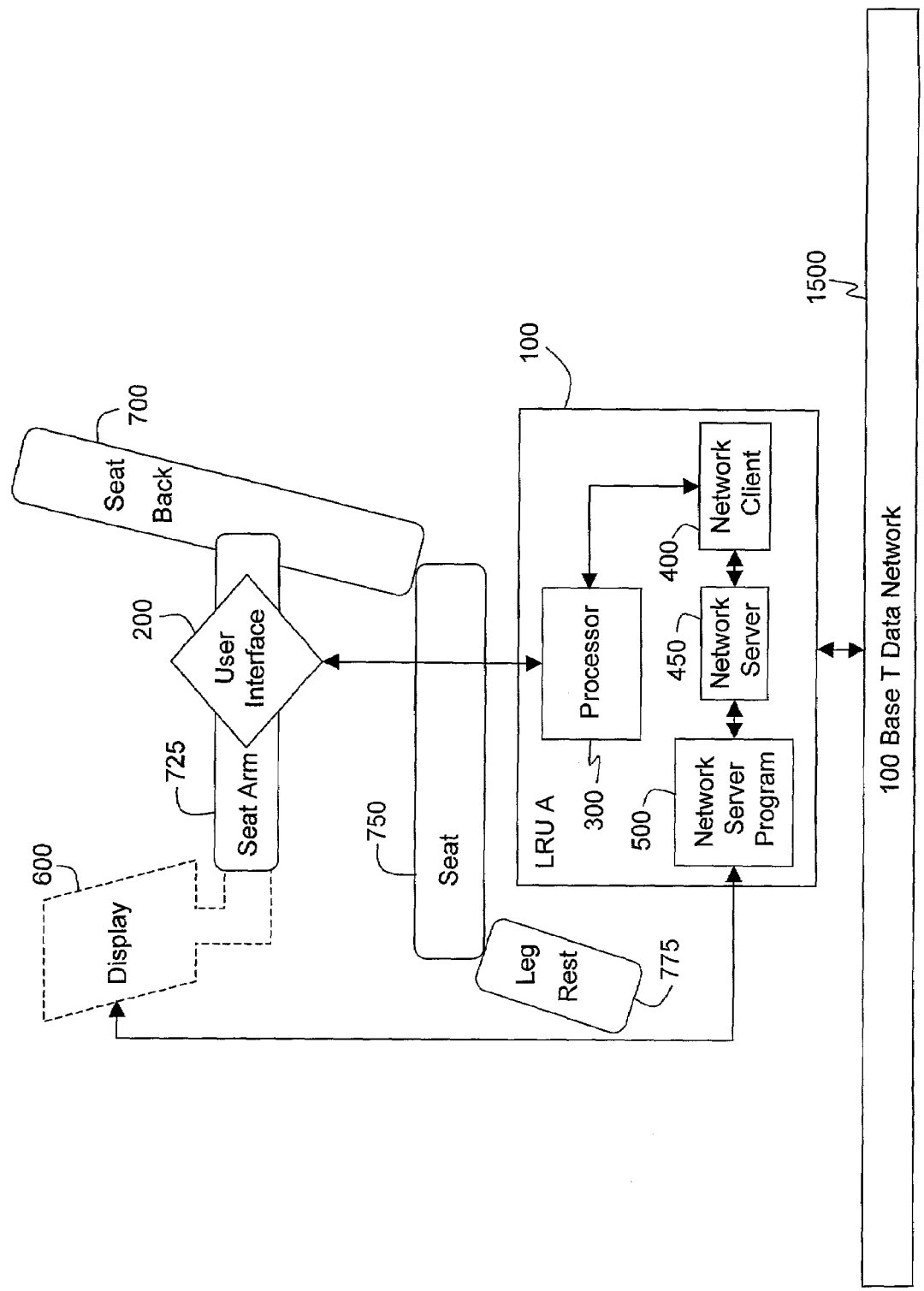
FIG. 1a is a schematic diagram of a first embodiment of a seat-level layout of a network protocol enabled in-flight entertainment system.

While the present invention is susceptible to various modifications and alternative forms, certain preferred embodiments are shown by way of example in the drawings and will be described in detail herein. It should be understood, however, that the description is not intended to limit the invention to the particular forms described; to the contrary, the description is intended to cover all modifications, alternatives, and equivalents falling within the spirit and scope of the invention defined by the appended claims.

The system and method of the present invention allow for a more flexible and modular IFE system by using network protocols for communication between LRUs within the system. Using network protocols improves efficiency of development efforts by reducing the probability of unintended conflicts between software loaded onto the plurality of LRUs within the system, and allows for easier upgrades and maintenance of software currently loaded within an IFE system. Network protocols are used in controlling a plurality of functions that the IFE system is capable of performing.

Figure 1B:
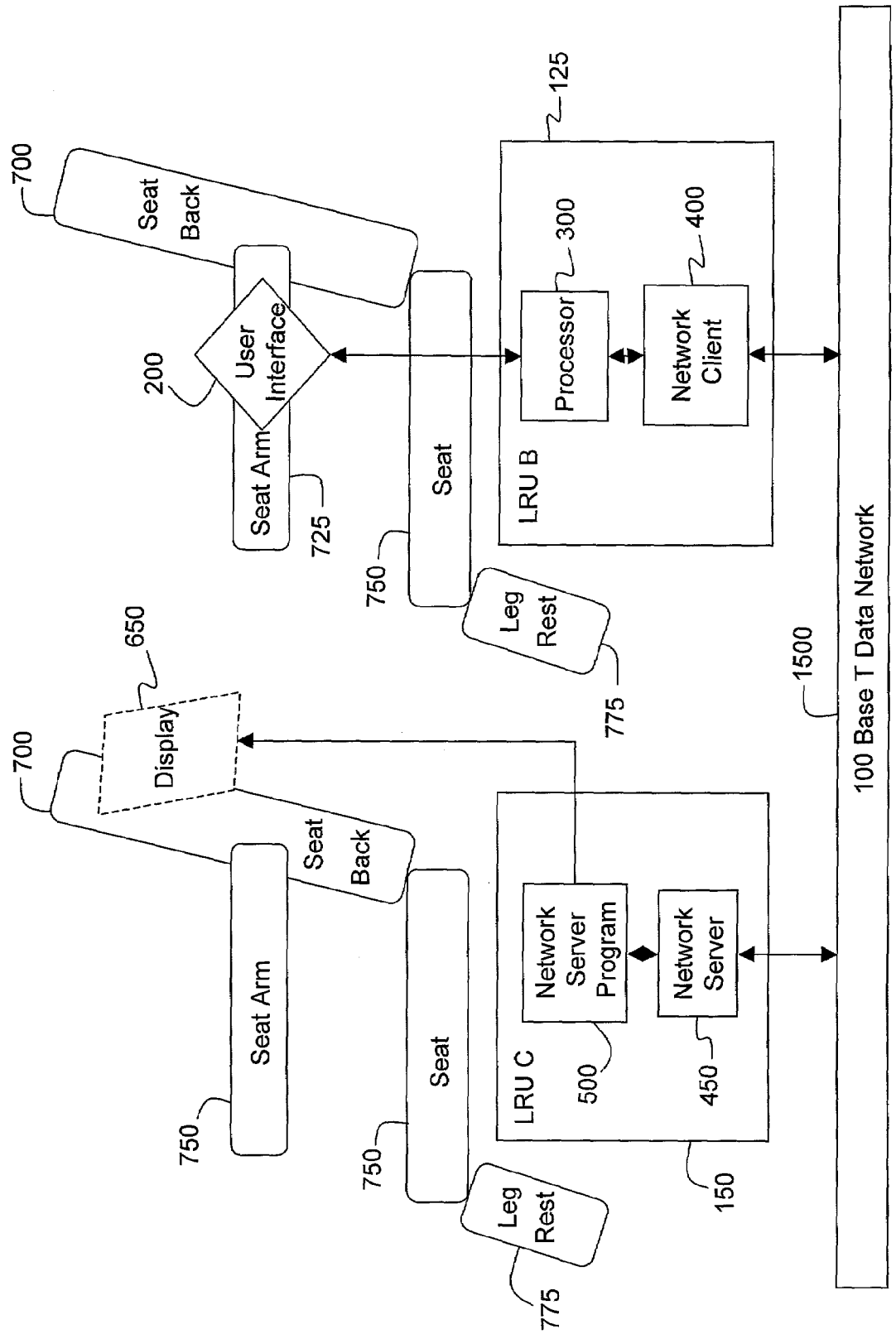
FIG. 1b is a schematic diagram of a second embodiment of a seat-level layout of a network protocol enabled in-flight entertainment system.

Although the system of the present invention can be carried out with programs loaded onto any of the plurality of LRUs within the IFE system, FIGS. 1a and 1b show an example of how the system of the invention might be implemented on LRUs in close proximity to a seat on the aircraft. Referring to FIG. 1a, there is shown a seat 750, with a seat back 700, seat arm 725, and leg rest 775. Connected to the seat is a user interface 200, which (as described in the SUMMARY OF THE INVENTION above) can be any device suitable for providing input signal to the system, such as a set of membrane buttons, or a touch-screen. The user interface 200 is connected to a processor 300 within the LRU A 100. The LRU A is, in an embodiment, a seat electronics box 2160 (as shown and described in connection with FIG. 2b below). The processor 300 located within the LRU A 100 is a processor suitable for converting an input signal from the user interface 200 into a control activation signal that may be supplied to a network client 400. The processor 300 includes, in an embodiment, both hardware and software effective for converting the analog or digital input signal provided by the user interface 200 into the control activation signal supplied to the network client 400; the software includes, in an embodiment, a key routing table for mapping a particular input signal generated by the user interface 200 into a particular control activation signal.

In one possible embodiment, the network client 400 and the network server 450 are located on the same LRU (LRU A 100 in the embodiment of the seat-level part of the IFE system shown in FIG. 1*a*). It is an advantage of the system of the present invention that the network client 400 and the network server 450 may be located on the same LRU, since this improves the speed with which some functions of the IFE system are executed. However, as will be shown in FIG. 1*b*, it is not necessary to the present invention that the network client 400 and the network server 450 be located on the same LRU.

Communication between the network client 400 and the network server 450 is carried out using network protocols, such as HTTP, FTP, or TELNET. In the presently preferred embodiment of the invention, the protocol used is HTTP. In this embodiment, the network client 400 is a web browser, implemented with a suitable programming language, such as C++, on an operating system compatible with the hardware on the LRU A 100, such as LINUX. The control activation signal supplied to the web browser results in a URL call to a network server 450, which, in an embodiment, is a web server, such as the APACHE TOMCAT web server. The network server program 500 is, in an embodiment, a CGI script loaded into memory on the hardware of an LRU A 100. The network server program 500 has control over the hardware resources of the IFE system 1000 that are necessary for performing a function of the IFE system 1000 associated with the LRU on which the network server program 500 is loaded. For example, if the function to be controlled is associated with an overhead reading light, then the network server program 500 is connected to a switch within an electronic circuit that controls the overhead light, and is capable of opening and closing the switch by executing instructions on the hardware of the LRU connected to the electronic circuit (which, in the embodiment of the present invention shown in FIG. 2*c*, is the area distribution box 2150). If the function to be controlled is associated with in-seat audio and video display, then the LRU running the network server program 500 might be a digital server unit 2500 or an audio/video controller 2120.

In the embodiment shown in FIG. 1*a*, the network server program 500 is connected to an optional display 600. The display 600 might include both audio and video capabilities (audio capability might be provided through headphones 2210 in FIG. 2*b*, described below). The network server program 500 executes instructions in order to control a function of the IFE system. The network server program 500 thus may act to coordinate the hardware components within the IFE system 1000 in controlling a complex function. An advantage of the present invention is that many network server programs 500 may run simultaneously on the same network server 450, and on different network servers 450. Several network clients 400 might request the same network server program 500 simultaneously, and the function performed by the network server program 500 can be performed at the request of several different users at the same time. A limit to the number of simultaneous requests is partly set by the network server 450 software (in an embodiment, the APACHE TOMCAT software running on the LINUX operating system) that serves as the platform for the network server program 500, and partly by the hardware resources of the LRU on which the network server program 500 is run.

As described in the SUMMARY OF THE INVENTION section, an advantage of the present invention is that the network server 450 and the network server program 500 may be run on any LRU (with capable hardware resources) within the IFE system 1000 without changing the method of the present invention. This allows for hardware resources to be conserved or distributed in a way that improves the efficiency of the overall IFE system 1000. The system of the present invention is very flexible and modular, and parts of the system may be moved around to different LRUs in different embodiments. This is possible since the connectivity of the parts of the system stays relatively constant when network protocols are used for communication between LRUs within the system. In a second embodiment of the seat-level part of the system shown in FIG. 1*b*, the network client 400 and the network server 450 are located on different LRUs within the system (LRU B 125 and LRU C 150). The network client 400 and the network server 450 communicate through the data network 1500, which is a 100 Base T Ethernet data network (1500 in FIGS. 2*a* and 2*b*, described below) in the presently preferred embodiment of the system. The separation of the network client 400 and the network server 450 gives rise to a slightly longer time lapse (between when an input signal is provided through the user interface 200 and when a function of the IFE system is performed), but the separation allows for a greater flexibility and modularity of the IFE system in that the network server 450 may be loaded on only a few of the LRUs within the IFE system rather than on every LRU that might receive a request from a user that a particular function be performed.

The optional display 650 shown in FIG. 1*b* is not connected directly to the seat with the user interface 200 (as in the embodiment of FIG. 1*a*). The display 650 is connected instead to the seat back 700 of the seat in front of the seat with the user interface 200. The method of the present invention is the same in FIGS. 1*a* and 1*b*; the difference in location of some parts of the system has no effect on the method of the present invention.

Figure 2A:
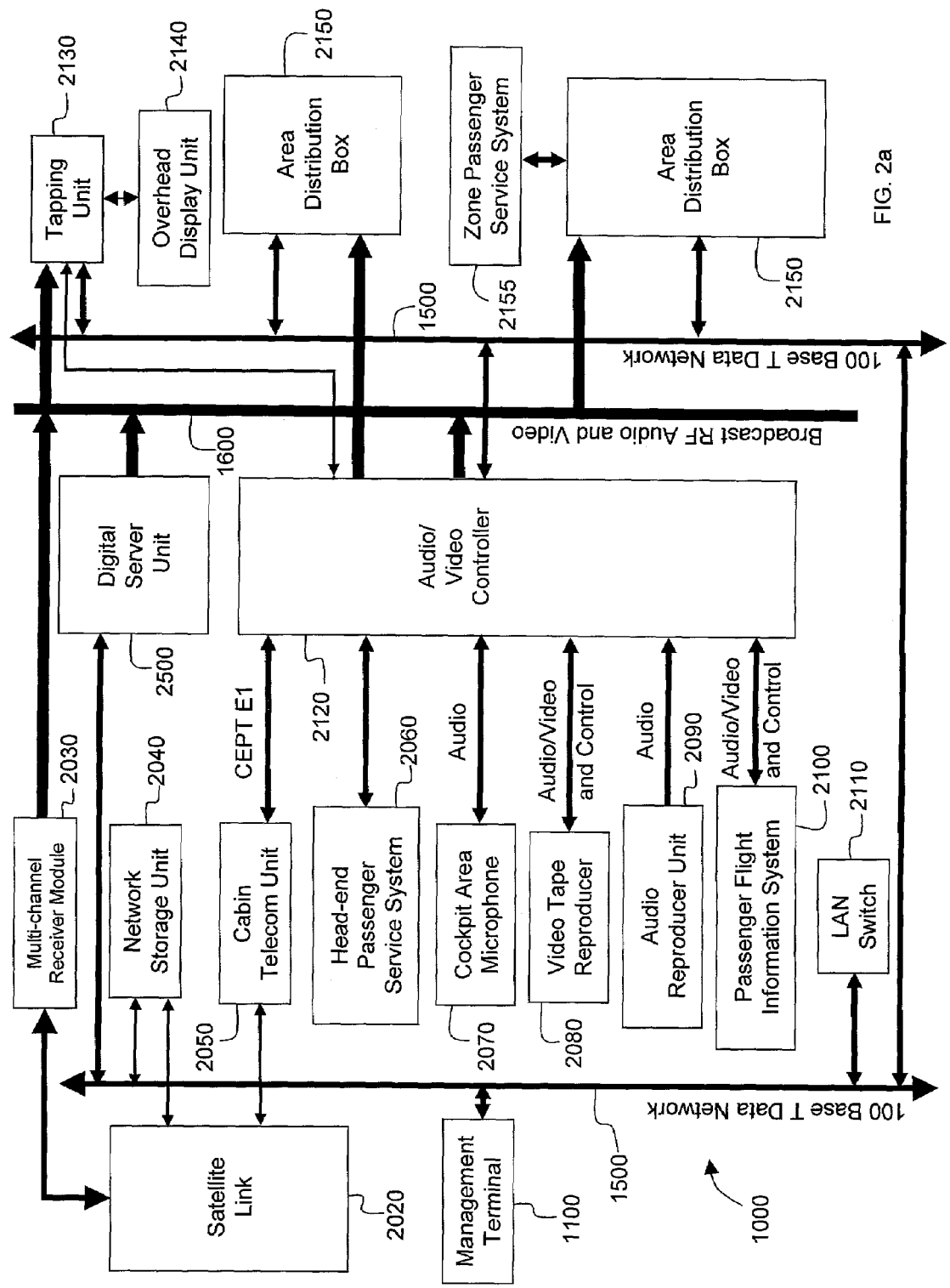
FIG. 2a is a block diagram of the hardware components used in a first part of an in-flight entertainment system, which includes head-end components, as used in accordance with an embodiment of the present invention.
Figure 2B:
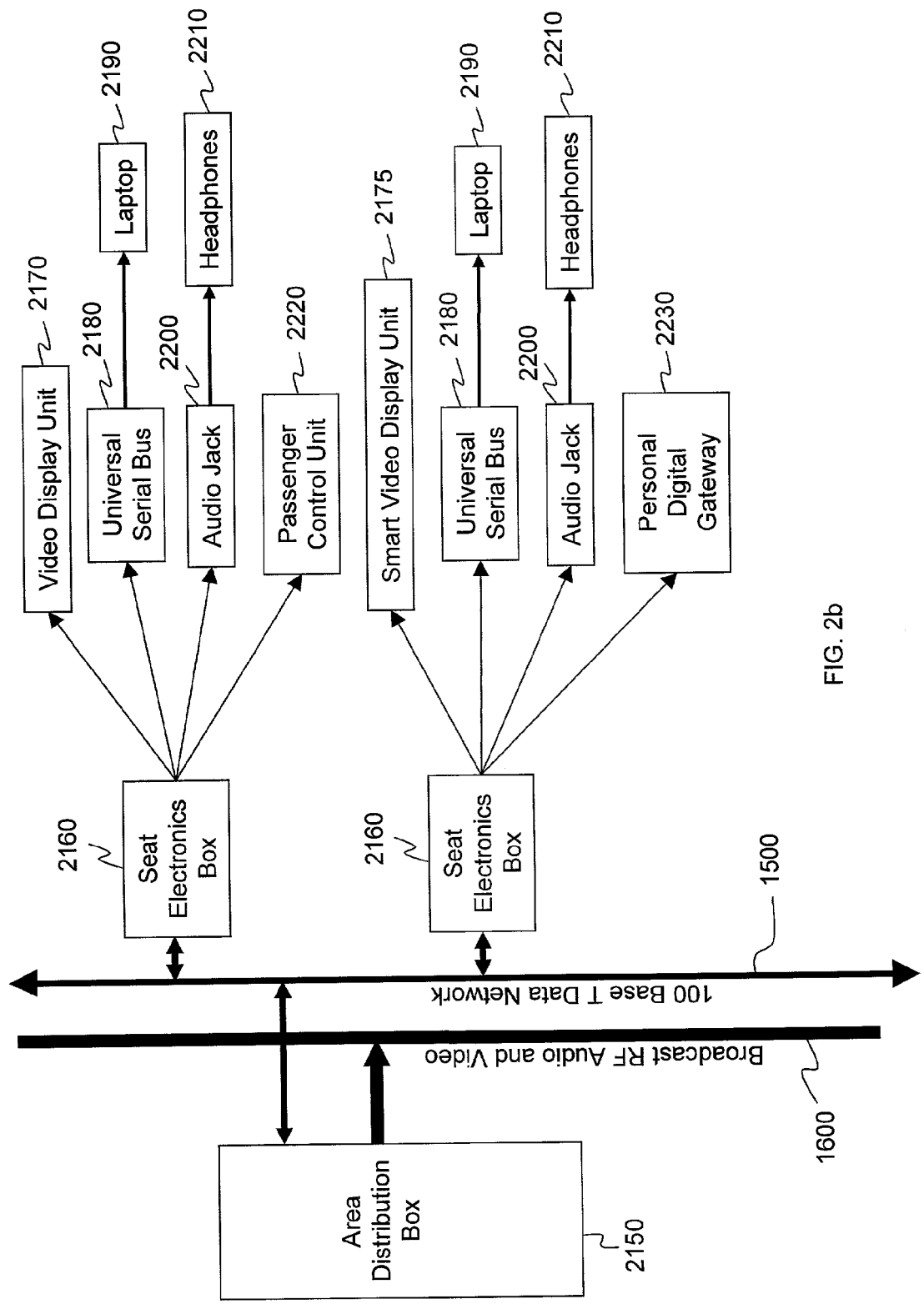
FIG. 2b is a block diagram of the hardware components used in a second part of an in-flight entertainment system, including seat-level client components, as used in accordance with an embodiment of the present invention.
Figure 2C:
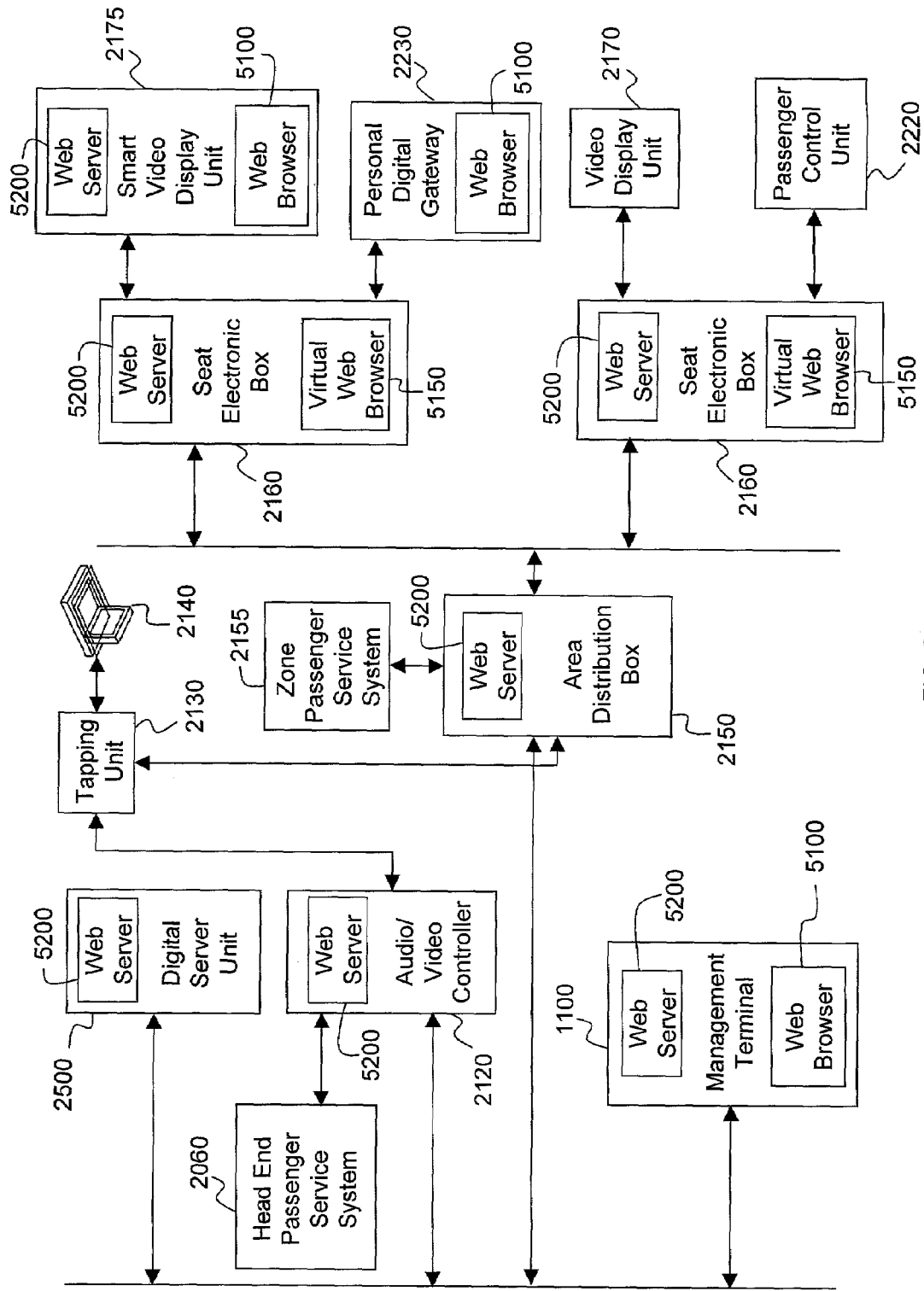
FIG. 2c is a block diagram of the software components used in a network protocol enabled in-flight entertainment system, as used in accordance with an embodiment of the present invention.

A block diagram of the hardware components of an embodiment of an entire IFE system 1000 is shown in FIGS. 2*a* and 2*b*. Most of the boxes in FIGS. 2*a* and 2*b* represent a single electronic component, known in the art as a line replaceable unit (LRU), since these components are fitted onto an aircraft in an assembly line when the aircraft is manufactured, and can be replaced during maintenance in a similar manner. The function, in accordance with an embodiment of the present invention, of each LRU within the present invention is described herein, with special attention to its use in the method of the present invention.

The system 1000 is generally a local area network (LAN) comprising a plurality of computer components that communicate over a network data backbone 1500 and an entertainment broadcast or RF backbone 1600. The network data backbone 1500 preferably uses 100 base T Ethernet, and the broadcast RF backbone 1600 is preferably capable of carrying high-bandwidth RF transmissions containing video and audio signals.

Generally, the LRUs within the system 1000 include a management terminal 1100, an audio/video controller 2120, a digital server unit 2500, one or more area distribution boxes 2150 and a plurality of tapping units 2130 in communication over the data backbone 1500. Any of these LRUs may have hardware capable of running a network client 400, a network server 450, or both. The audio/video controller 2120, digital server unit 2500, and other auxiliary devices can provide audio and video signals over the RF broadcast backbone 1600 to the area distribution boxes 2150 or tapping units 2130. The area distribution box 2150 passes the signal to one or more seat electronics boxes (2160 in FIG. 2*b*) within its associated area. Alternatively, the tapping unit 2130 receives the signal from the broadcast backbone 1600 and sends the signal to one or more associated overhead display units 2140.

Management Terminal

In FIG. 2a, the cabin management terminal 1100 is, in an embodiment, a central user interface to the IFE system 1000 for flight crew members. Using a management terminal 1100 as a user interface 200, a crew member might start and stop an in-flight movie, make announcements to passengers, or check food and drink orders. The management terminal 1100 also allows a user to enable or disable the availability of audio/video content or the Internet to passengers on the plane, or to enable or disable other functions of the IFE system 1000 available to passengers through a user interface 200. Most functions of the IFE system, whether initiated by a crew member or by a passenger, are controlled by a separate network server program 500 dedicated to controlling a particular function of the IFE system 1000. But as described above, the network server program 500 need not be located on an LRU nearby a physical location at which an input signal is generated. The management terminal 1100 might run only a network client 400 (as LRU B 125 shown in FIG. 1b), receiving a network server response from a network server program 500 on a different LRU within the IFE system 1000. Or, in another embodiment, the management terminal 1100 may have both a network server 450 (capable of running a network server program 500) and a network client 400. One such embodiment is shown in FIG. 2c, in which the management terminal 1100 is shown running both a web server 5200 and a web browser 5100.

In another embodiment of the present invention, a network server program, such as a CGI script, running on a network server on the management terminal is capable of controlling a function associated with an audio or video radio-frequency broadcast to passengers on the aircraft, an in-seat audio or video stream, interactive game playing, access to the Internet, an overhead reading light, a flight-attendant call system (including, for example, a display of passenger requests by seat), a climate adjustment system (including, for example, a thermostat connected to an air-conditioner), a surveillance system (including, for example, one or more security cameras and one or more displays attached thereto), a cabin audio or video announcement system, or a display (audio, video, or both) of passenger flight information.

The management terminal 1100 is connected, in an embodiment, to a 100 Base T Ethernet data network (heretofore "Ethernet") 1500. The local area network (LAN) switch 2110 in FIG. 2a is an important feature of the IFE system 1000. The LAN switch 2110 allows for each LRU node connected to the Ethernet to be treated as a single segment, and faster data transfer through the Ethernet results. Multiple LAN switches 2110 are used in another embodiment of the system 1000. The present invention operates according to an appropriate networking communication standard, such as Ethernet 100 Base T, 10 Base 2, 10 Base 5, 1000 Base T, 1000 Base X, or Gigabit network. In yet another embodiment, the network could instead be an Asynchronous Transfer Mode (ATM), Token Ring, or other form of network.

Area Distribution Box

The area distribution box 2150 is generally a local seat-level routing device. The area distribution box 2150 controls the distribution of signals on the network data backbone 1500 and the RF backbone 1600 to a group of the seat electronics boxes 2160 (FIG. 2b). The area distribution box 2150 maintains assigned network addresses of seat electronics boxes 2160 and, optionally, tapping units 2130. The area distribution box 2150 preferably also includes built-in test equipment (BITE) capabilities. Additionally, the area distribution box 2150 controls and communicates with a corresponding zone passenger service system 2155 that includes, for example, overhead reading lights and attendant call indicators. Optionally, the area distribution box 2150 further operates to control the tapping unit 2130 in a similar way to that described below in connection with the audio/video controller 2120. In an embodiment, the area distribution box 2150 may have hardware effective for running a network client 400, a network server 450, or both. In the embodiment of the invention shown in FIG. 2c, the area distribution box 2150 includes a web server 5200 as a network server 450, which is capable of running a network server program 500 (such as a CGI script), which may control a function associated with the area distribution box 2150 within the IFE system 1000, such as control of: an in-seat power supply, an overhead reading light, interactive game playing, access to the Internet, an audio or video cabin announcement system, a display of passenger flight information, or an in-seat telephone.

The hardware of the area distribution box 2150 includes one or more microprocessors with a memory, such as a flash memory, a network interface card, an RS485 interface, and radio frequency amplifiers. Additionally, in an embodiment, the area distribution box 2150 contains appropriate gain control circuitry for gain control of the RF distribution 1600. In an embodiment, the software running or stored on the area distribution box 2150 might include multiple software components, such as an operating system (e.g., LINUX), a web server (e.g., APACHE TOMCAT), TCP/IP, FTP client, FTP server, and ports or connectors for interfacing with the tapping unit(s) and CSS. An appropriate interface includes a serial port, such as RS485 interface, or a USB. As will be recognized by those of skill in the art, embodiments of the area distribution box 2150 are capable of running a network client 400, a network server 450, or both depending on the hardware resources available.

Audio Video Controller

The audio/video controller 2120 generally operates as an entertainment head-end controller. The audio/video controller 2120 communicates with a plurality of input signal devices, such as cameras, video players, and audio players. The audio/video controller 2120 is in communication with both the data backbone 1500 and the broadcast backbone 1600. The functions controlled by the audio/video controller 2120 include, for example, distributing audio and video content, controlling the tapping units 2130 and overhead display units 2140, and frequency modulation for various inputs such as video tape reproducer 2080 and audio reproducer unit 2090. In the embodiment of the invention shown in FIG. 2c, the audio/video controller 2120 has a network server 450 in the form of a web server, which is capable of running network server programs 500, such as CGI scripts, for controlling functions associated with the audio/video controller 2120 within the IFE system 1000, such as control of a radio-frequency broadcast of audio or video, an in-seat audio or video stream (for example, of digital media), interactive game playing, access to the Internet, a flight-attendant call system, a surveillance system, a cabin audio or video announcement system, or a display of passenger flight information.

Additionally, in an embodiment, the audio/video controller 2120 operates as a head-end controller of the passenger service system 2060 (PSS), which includes, for example, the public address system and warning indicators instructing passengers to fasten seat belts or not to smoke. Accordingly, the audio/video controller 2120 is connected to PSS related inputs such as the cockpit area microphone 2070, which can interrupt other signals over the RF backbone 1600 for crew announcements. By incorporating PSS control functions into the audio/video controller 2120, the need for a separate LRU for controlling the PSS functions is eliminated.

Furthermore, the audio/video controller 2120 operates the passenger flight information system (PFIS) 2100 as a point of access for system data, including data obtained from non-IFE system equipment, such as aircraft identification, current time, flight mode, flight number, latitude, longitude, and airspeed. To facilitate external communications, the audio/video controller 2120 is further in communication with a cabin telecom unit 2050 that can communicate with earth or satellite based communication stations through one or more satellite links 2020.

As would be recognized by those of skill in the art, embodiments of the audio/video controller 2120 are capable of running a network client 400, a network server 450, or both, depending on the hardware resources available. Any LRU with hardware capable of running a network client 400 or a network server 450 may be loaded with them, as necessary for controlling a function associated with the audio/video controller 2120 within the IFE system 1000.

The audio/video controller 2120 hardware includes a microprocessor, an Ethernet switch, telephony interface components, an Aeronautical Radio, Inc. (ARINC) interface, an RS485 interface, and audio modulators for the public address and audio/video content distribution. The audio/video controller 2120 contains various software components including, for example, an operating system such as LINUX, a web server such as APACHE TOMCAT, TCP/IP clients or servers such as FTP clients or servers, RS485 interfaces to the tapping units and CSS, and LAPD communications.

Digital Server Unit

The digital server unit 2500 provides analog and video outputs derived from digital content stored, for example, on a hard disk drive, and is constructed modularly with a well-defined external interface. A rack mount is provided with electrical and physical interfaces as specified in ARINC 600 (an aircraft manufacturer promulgated standard). The digital server unit 2500 obtains power, connects to external control interfaces, provides 6 base-band video outputs with 2 stereo audio outputs associated with each video output and 12 stereo outputs and 1 RF output that combines 3 RF inputs with 6 modulated video signals (including 12 stereo video-audio) and 12 stereo modulated audio outputs at this connector. Auxiliary front mounted connectors are also provided for diagnostic access and expansion of the storage sub system via a SCSI II interface.

The digital server unit 2500 provides video entertainment in a way similar to a videotape reproducer 2080 or audio tape reproducer 2090. Instead of videotape, video content is stored in compressed format, compliant with the Motion Picture Expert Group (MPEG) format (MPEG-1 or MPEG-2). The video data is stored in multiplexed format including video and between one and sixteen audio tracks in the MPEG-2 transport stream format. The audio content is stored, instead of with audio tape, on a hard disk in compressed format, compliant with the MPEG-3 (MP3) format. The high performance disk drive is accessed via a wide and fast SCSI interface by the CPU on the controller. The digital content is then streamed via TCP/IP to client platforms on circuit cards within the digital server unit 2500.

Two types of clients are implemented: video clients (two per circuit card) and audio clients (four per card). Each video client can generate one video output with two associated simultaneous stereo language tracks selected from up to sixteen language tracks multiplexed with the video. Each audio client can generate 3 or 4 audio outputs. The digital server unit 2500 contains three video client cards for a total of six video clients and six associated dual stereo video and audio/video outputs. Twelve of the audio outputs are general purpose in nature, while the 13th and 14th outputs are used to implement PRAM and BGM functions. As these two aircraft interfaces are generally monaural, MP3 programming for the 13th and 14th audio outputs is encoded and stored as monaural MP3, and only the left channel of the stereo decoder is connected to the appropriate aircraft public address system input.

The video clients are not only digital MPEG audio/video decoders, but are also general purpose PC compatible platforms, and may implement customized functions that are displayed as broadcast video channels through the broadcast backbone 1600. A typical example of this use of a video client is the implementation of a Passenger Flight Information System (PFIS) 2100.

As will be recognized by those of skill in the art, embodiments of the digital server unit 2500 are capable of running a network client 400, a network server 450, or both depending on the hardware resources available. In particular, as shown in FIG. 2c, the digital server unit 2500 is useful for running a network server program 500, such as a CGI script, which is useful for controlling functions of the IFE system 1000 associated with: an in-seat audio or video stream (of digital content), a radio-frequency audio or video broadcast, interactive game playing, access to the Internet or to information stored from the Internet on the digital server unit 2500 hard disk, a surveillance system, a cabin audio or video announcement system, or a display of passenger flight information.

Satellite Link

To communicate with people outside the aircraft, the IFE system 1000 includes an optional satellite link 2020 in FIG. 2a, which can provide additional sources of audio, video, voice, and data content to the IFE system 1000. In connection with a multi-channel receiver module 2030, it provides a plurality of video channels to the IFE system 1000. In an embodiment, the multi-channel receiver module 2030 is connected to the RF backbone 1600 that connects to other LRUs within the IFE system. The satellite link 2020 may also provide Internet access in combination with a network storage unit 2040, wherein a plurality of popular web pages are downloaded to the network storage unit 2040 while the aircraft is on the ground, when the satellite link bandwidth is not consumed with bandwidth intensive graphics or movies. In cooperation with the cabin telecommunications unit 2050, the satellite link 2020 may also provide access to ground-based telephone networks, such as the North American Telephone System (NATS). The satellite link 2020, and the network storage unit 2040, are capable of running a network client 400, a network server 450, or both.

Tapping Unit

Generally, the tapping unit 2130 is an addressable device for tapping the broadcast signal and distributing selectable or predetermined portions of the signal to one or more display units. Accordingly, the tapping unit 2130 is connected directly to one or more overhead display units 2140 mounted for viewing by a single passenger or by a group of passengers. The overhead display unit 2140 may be mounted, for example, to a bulkhead or ceiling in an overhead position, in the back of a seat in front of a viewer, an adjustable mounting structure, or in any appropriate location. In an embodiment, the IFE system 1000 includes multiple tapping units 2130. The tapping unit functions to turn the display unit on or off, and to tune the tuner for audio or video channel selection. In an embodiment, the tapping unit 2130 is also used to report the status of the radio RF signal on the audio/video RF backbone 1600. In the embodiment shown in FIG. 2c, the tapping unit 2130 does not have a network client 400 or a network server 450. In other embodiments, however, the tapping unit 2130 may have one or both of these software components, as will be recognized by those of skill in the art.

Seat Electronics Box

In FIG. 2b, which is a continuation of the block diagram of FIG. 2a, there is shown a plurality of seat electronics boxes 2160, connected to the area distribution boxes 2150 through the network data backbone 1500. Each of the seat electronics boxes 2160 provides an interface with individual passenger control units 2220, personal digital gateways 2230, video display units 2170, or smart video display units 2175 available to the respective passengers on the aircraft. In another embodiment (not shown in FIG. 2b), more than one video display unit 2170 or passenger control unit 2220 are connected to each seat electronics box 2160. The seat electronics boxes 2160 also control the power to video display units 2170, the audio and video channel selection, and volume. One or more universal serial buses 2180 or audio jacks 2200 are also connected to the seat electronics boxes 2160, allowing a passenger to connect a laptop computer 2190 or headphones 2210 into the network 1000. Hardware on a seat electronics box 2160 includes (in an embodiment) a microprocessor, RF tap, RF amplifier, RF level detection, RF gain control, and RF splitter, an FM tuner, and a digital signal processor (DSP) for handling voice over IP. In the embodiments of the system of the invention shown in FIGS. 1a and 1b, the LRU A 100, LRU B 125, and LRU C 150 might be seat electronics boxes 2160, although it is not necessary to the method of the present invention (as described above) for the LRUs shown to be seat electronics boxes 2160. As would be recognized by those of skill in the art, embodiments of the seat electronics box 2160 are capable of running a network client 400, a network server 450, or both depending on the hardware resources available. In an embodiment, a network server program 500 running on a network server 450 on a seat electronics box 2160 is used to control functions of the IFE system 1000 associated with: an in-seat power supply, an overhead reading light, a climate adjustment system, a seat adjustment system (including, for example, control of one or more motors used for moving the seat), or an in-seat telephone.

As indicated in FIG. 2c, in an embodiment of the present invention, the seat electronics box 2160 has both a network client 400 (in the form of a virtual web browser 5150), and a network server 450 (in the form of a web server 5200). In other embodiments of the present invention, a different set of software components may be loaded onto the seat electronics box 2160, as will be recognized by those of skill in the art.

In view of the foregoing description of the hardware architecture of the network 1000, described now will be steps of how the system 1000 is capable of performing a function using network protocols for communication between a network client 400 and a network server 450 located on one or more LRUs within the system, the network server 450 being capable of running a network server program 500 for controlling a function of an IFE system by executing one or more instructions on one or more LRUs attached to the system.

It is very important to note that the specific functions carried out by a particular LRU within an IFE system may vary from embodiment to embodiment. An attempt has been made in the foregoing to describe how each of the LRUs in the IFE system 1000 may be used, in different embodiments, to control one or more functions associated with the IFE system 1000. It must be borne in mind, however, that as the hardware components of an IFE system are reconfigured and moved around within the system, that the functions controlled by a specific LRU will change, and that one of ordinary skill in the art would recognize how, given a specific set of hardware components, the software components necessary to the present invention should be implemented. The heart of the present invention is a system and method for using network protocols to enable control of a function associated with an IFE system, and this system and method remain the same from embodiment to embodiment, even as the LRUs used to control a particular function of the system vary.

Figure 3:
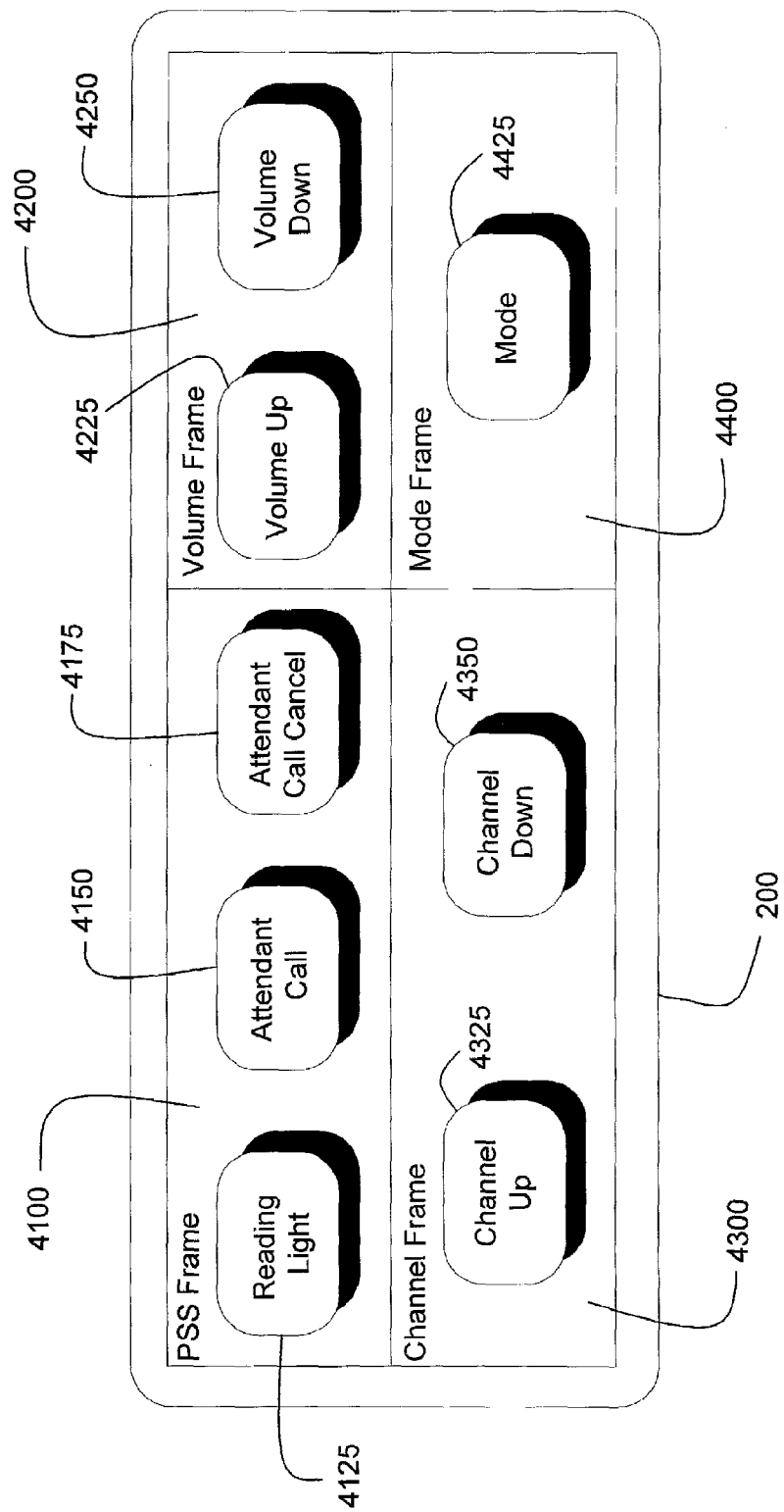
FIG. 3 is an example of a user interface, as used in accordance with an embodiment of the present invention.

A passenger on an aircraft with an IFE system 1000 generates an input signal for the system with a user interface 200, for example, a user interface as shown in the embodiment of FIG. 3. As described above, the user interface 200 may be implemented with mechanical buttons, such as membrane buttons, or with a more versatile device with keyboard and display, or a dynamically updateable touchscreen. The user interface 200 may also include a fewer or a greater number of options than the number of options shown (such as "ATTENDANT CALL" or "VOLUME UP") in FIG. 3. As will be recognized by those of skill in the art, the user interface 200 can take a variety of forms. Table 1 shows, as an example, an embodiment of the network server requests generated by a press of some of the buttons shown in FIG. 3.

TABLE 1

| FUNCTION | HTTP REQUEST |
|---|---|
| VOLUME UP | "http://Seat21A/AudioVolume.html/vol=up" |
| VOLUME DOWN | "http://Seat21A/VideoVolume.html/vol=down" |
| READING LIGHT | "http://AVC/pss.html/ Seat=21A&light=toggle" |
| MODE | "http://Seat21A/mode.html/mode=Audio" |
| CHANNEL UP | "http://Seat21A/AudioChannel.html/ch=up" |
| CHANNEL DOWN | "http://Seat21A/VideoChannel.html/ch=down" |

The user interface 200 includes, in the embodiment of FIG. 3, four different frames: the PSS frame 4100, the volume frame 4200, the channel frame 4300, and the mode frame 4400. The frames allow for each of the types of input signal that may be generated by the user interface 200 to be grouped for ease of implementation. According to an aspect of the present invention, each frame might call a different CGI script for use in controlling a particular function of the IFE system 1000. The user interface 200 shown in FIG. 3 might be implemented as part of the passenger control unit 2220 or personal digital gateway 2230 shown in FIG. 2b.

The user interface 200 shown in FIG. 3 connects, in an embodiment, to a seat electronics box 2160, although in other embodiments, the user interface 200 might be connected to a different LRU, or to the data network 1500 directly (this is the case when a laptop is connected to the system for use in maintenance and testing). In another embodiment, the user interface 200 is integrated with the management terminal 1100. A plurality of user interfaces 200 may be connected to the system, and an important advantage of the system of the present invention is that it is capable of receiving input signals from a plurality of users, and of performing a plurality of functions simultaneously. When a user interface 200 is connected to a seat electronics box 2160, the seat electronics box 2160 includes a processor 300, as described in connections with FIGS. 1a and 1b.

With the embodiment shown in FIG. 3, when a passenger in a seat desires to adjust the volume up, he or she presses a volume up button 4225. The processor 300 connected to the user interface 200 translates an input signal generated by the button press into a control activation signal corresponding to the volume up, which is supplied to the network client 400. For the embodiment of FIG. 3, the network client 400 is a web browser. The web browser generates a network server request for VOLUME UP in the HTTP format, as shown in Table 1. The particular network server request that corresponds to the particular input signal generated is sent, using a low-layer network protocol such as TCP or UDP, to the network server 450, which runs a network server program 500, such as a CGI script programmed to change the volume. When the network server program 500 is run, the volume of an audio stream generated from data on, for example, a digital server unit 2500, is adjusted up. The function performed is in accordance with the kind of input signal generated, and many different functions, both simple and complex, may be controlled. Examples of network server requests for other functions are shown in the embodiment of FIG. 3, including ATTENDANT CALL 4150 and MODE 4425. The MODE function may be used, for example, to switch between control of the audio and control of the video content offered by the IFE system. The use of the other buttons shown in FIG. 3 is known to those of ordinary skill in the art.

An advantage of the present invention is that some functions of the IFE system 1000 may be restricted to a particular user or group of users on an aircraft. In the embodiment of the present invention shown in FIGS. 2b and 2c, there are shown both video display units 2170 and smart video display units 2175; there are shown also passenger control units 2220 and personal digital gateways 2230. The passenger control unit 2220 is not capable of controlling all of the functions that may be controlled by the personal digital gateway 2230. As shown in FIG. 2c, the personal digital gateway is loaded with its own network client 400 in the form of a web browser 5100 (which requires the personal digital gateway 2230 to include a display of some kind). The passenger control unit 2220 does not have its own network client 400, and relies on a connection to a virtual web browser 5150 loaded onto a seat electronics box 2160 for carrying out the steps of the method of the present invention that require a network client 400. Similarly, the smart video display unit 2175 has more capability for controlling functions of the IFE system 1000 than does the video display unit 2170. The difference in capabilities may be manifest, in an embodiment of the present invention, in the installation of smart video display units 2175 and personal digital gateways 2230 only in the first class section of the aircraft.

As will be recognized by those of skill in the art, many functions of the IFE system 1000 may be enabled or disabled with software alone. However, as described in connection with the relative capabilities of smart video display units 2175 and video display units 2170, and with the relative capabilities of personal digital gateways 2230 and passenger control units 2220, some functions of the IFE system 1000 may be enabled or disabled simply by installing or removing particular hardware components from specific places within the IFE system 1000.

When a network server program 500 is run, an output of some kind may be generated in addition to the execution instructions for controlling a function of the IFE system 1000. In an embodiment of the present invention, the output is a network server response, such as those shown as 6300 and 6350 in FIG. 4a and 6900 and 6950 in FIG. 4b. In the presently preferred embodiment of the invention, the network protocol used is HTTP. Hence, the "button pages" generated as network server responses in FIGS. 4a and 4b are in the presently preferred embodiment of the invention web pages in the HTML format that have been generated by a CGI script corresponding to the network server program 500 for a particular function.

Figure 4A:
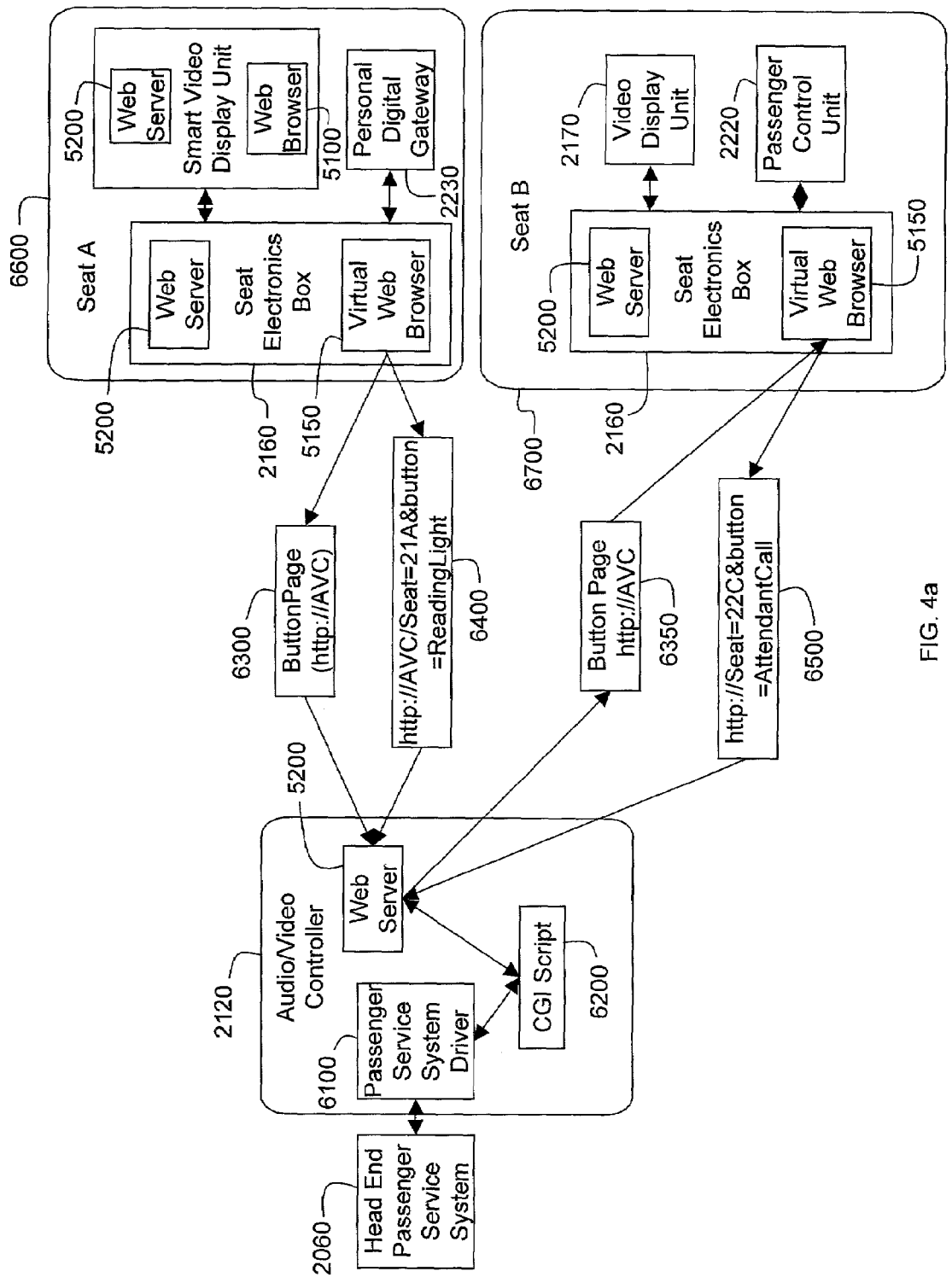
FIG. 4a is a schematic diagram showing network server requests and network server responses in a first embodiment of the present invention.

In the embodiment of the invention shown in FIG. 4a, the audio/video controller 2120 is connected directly to the head-end passenger service system 2060. According to this embodiment, when a passenger in seat 21A (labeled 6600) presses a button near his or her seat to activate a reading light, the method of the present invention (described further below in FIG. 5) is carried out with, in an intermediate step, a network server request resulting. The network server request corresponding to the activation of the reading light by the user is labeled 6400 in FIG. 4a. Similarly, if a passenger in seat 22C decides to call a flight attendant to his or her seat, a network server request may be generated following the steps of the method of the invention, with an embodiment of that network server request labeled 6500 in FIG. 4a. In both cases, the network server requests are sent to a web server 5200 on the audio/video controller 2120, which runs a CGI script 6200 (which may be different for the two functions although only one CGI script is shown in FIG. 4a), with the CGI script 6200 executing instructions that are translated by a passenger service system device driver 6100 into direct control of a particular function associated with the head-end passenger service system 2060, in this case, either attendant call or activation of the reading light. The CGI script 6200 may also generate a network server response in the form of a web page 6300 or 6350, as described above. In an embodiment of the present invention, a web page may also be cached on a seat electronics box 2160, with subsequent web pages being received from the web server 5200 on the audio/video controller 2120.

Figure 4B:
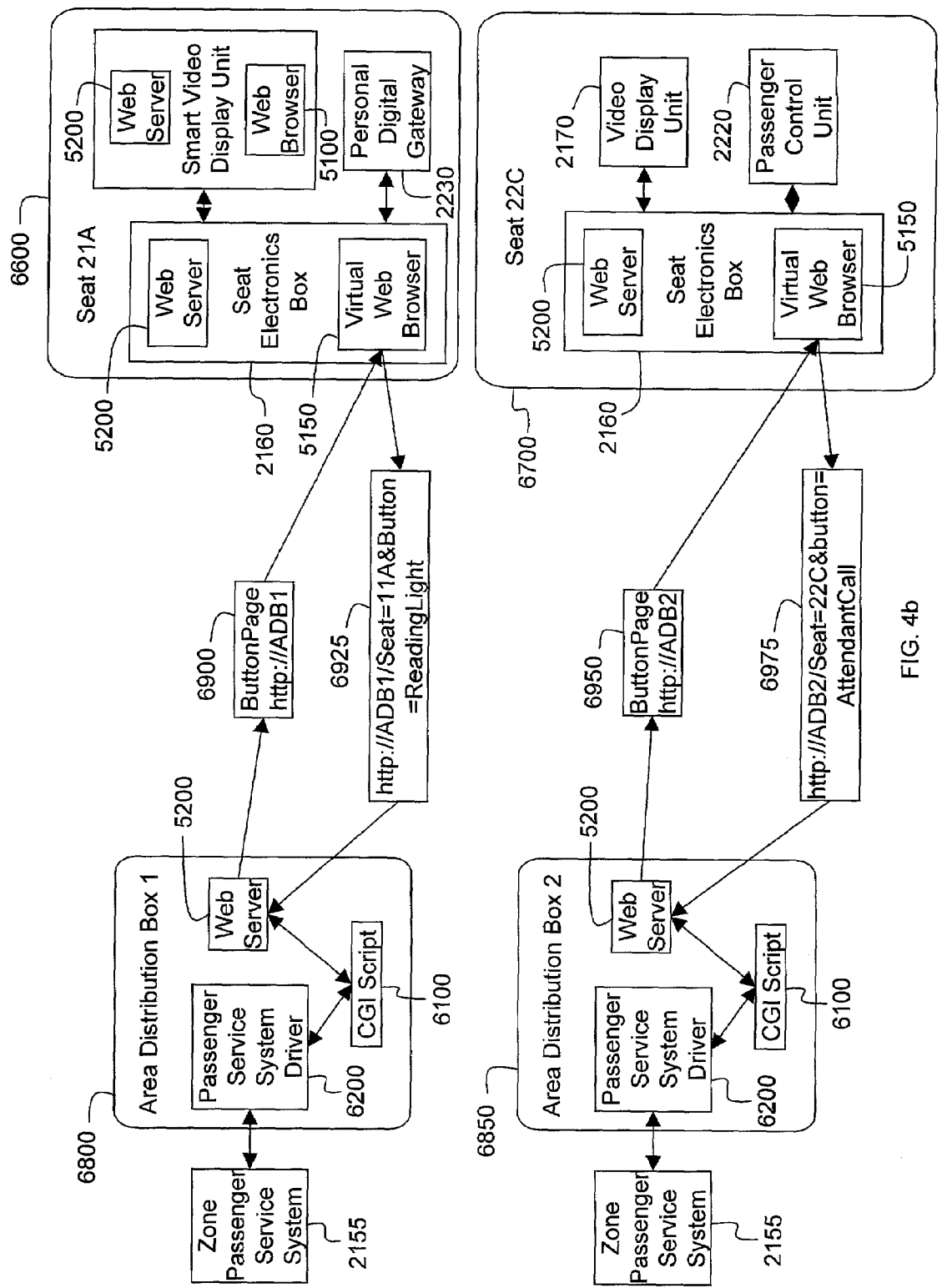
FIG. 4b is a schematic diagram showing network server requests and network server responses in a second embodiment of the present invention.

The embodiment of the invention shown in FIG. 4b is similar to the embodiment shown in FIG. 4a. One difference is that area distribution box 1 6800 and area distribution box 2 6850 are each used to control a zone passenger service system 2155 rather than using one audio/video controller 2120 to control a head-end passenger service system 2060. The steps of the method and the structure of the system are otherwise similar, with network clients 400, such as web browsers 5100 or virtual web browsers 5150, network servers 450, such as web servers 5200, and network server programs 500, such as CGI scripts 6200, all working in the same way as described in FIGS. 1a–1b and 2a–2c. FIG. 4b is included primarily to show the flexibility with which the system of the present invention may be designed. In addition, FIGS. 4a and 4b show how different LRUs within the system may be used to control the same functions, should one or more LRUs within the system fail.

The IFE system 1000, as shown and described in connection with FIGS. 1–3, is useful in performing functions using network protocols, such as HTTP, FTP, or TELNET.

Figure 5:
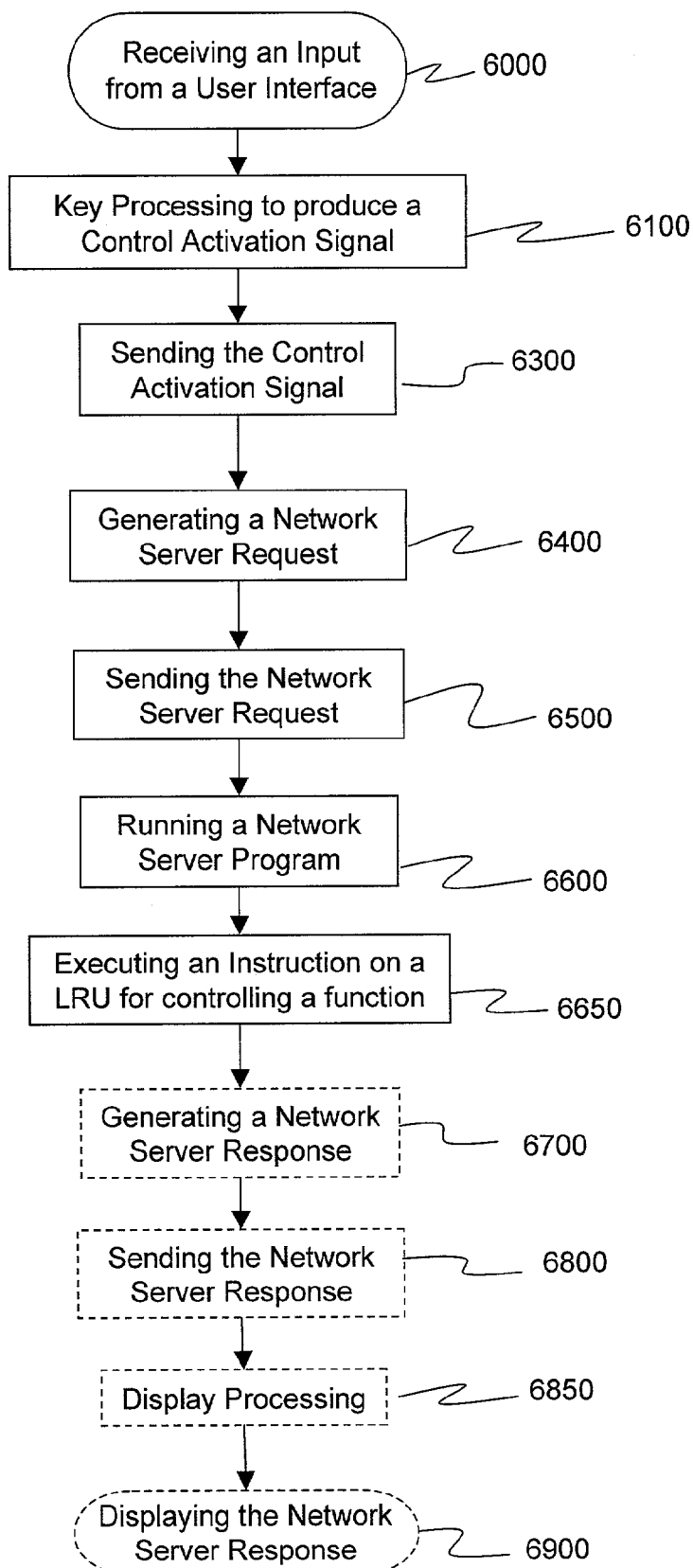
FIG. 5 is a control flow chart of a method for controlling a function of an IFE system, as used in accordance with an embodiment of the present invention.

A control flow diagram of an embodiment of the steps in a method of performing a function of the IFE system 1000 using network protocols is shown in FIG. 5. In a first step 6000, a user of the IFE system 1000 generates an input signal using a user interface 200. The input signal generated is supplied to a processor 300, which performs the step of key processing 6100, useful for converting the input signal received from the user interface 200 into a control activation signal. In step 6300, the control activation signal is sent to a network client 400, which, in step 6400, generates a network server request that corresponds to the input signal generated by the user interface 200 in step 6000 (as explained in connection with FIGS. 4a and 4b above). The network server request is sent to a network client 450 in step 6500. After receiving the network server request, the network server 450 responds by running in step 6600 a network server program 500 for controlling a function of the IFE system 1000 by executing, in step 6650, one or more instructions on one ore more LRUs. As described in connection with FIGS. 1a and 1b above, the steps of the method of FIG. 5 need not be performed on a single LRU within the IFE system 1000.

There are additional optional steps that may follow the performing of a function of the IFE system 1000 in step 6600. In some embodiments, such as the ones shown in FIGS. 4a and 4b, the network server program 500 may generate in step 6700 a network server response. In such an embodiment, the network server program 500 may in step 6800 send the network server response to the network client 400. The network server response may then be processed in step 6850, and finally displayed in step 6900.

It should be understood that various changes and modifications to the presently preferred embodiments described herein would be apparent to those skilled in the art. Such changes and modifications may be made without departing from the spirit and scope of the present invention and without diminishing its attendant advantages.

What is claimed is:

1. A network protocol enabled in-flight entertainment system, comprising:
    head-end equipment, including controller equipment that control the in-flight entertainment system;
    a plurality of line-replaceable units separate from the head-end equipment and coupled to the head-end equipment, at least one line-replaceable unit of the plurality of line-replaceable units being an electronics box located at a seat, said electronics box comprising:
        a processor for processing an input signal generated by a user interface connected with a line-replaceable unit of the plurality of line-replaceable units, and for generating a control activation signal in response to the input signal;
        a network client program running on the processor for receiving the control activation signal, and for generating a network sewer request in a network protocol format;
        a network server program running on the processor for receiving the network server request, and for controlling a function of the in-flight entertainment system by executing at least one instruction on another of the line-replaceable units of the plurality of line-replaceable units that is remote from said electronics box in accordance with the received network server request.

2. The network protocol enabled in-flight entertainment system of claim 1, wherein the network server program also generates a network client response providing to the network client information about the function performed by the network server program.

3. The network protocol enabled in-flight entertainment system of claim 1, wherein the network client program is a virtual web browser.

4. The network protocol enabled in-flight entertainment system of claim 1, wherein the network client program is a web browser.

5. The network protocol enabled in-flight entertainment system of claim 1, wherein the network server request follows Hyper Text Transfer Protocol.

6. The network protocol enabled in-flight entertainment system of claim 1, wherein each line-replaceable unit of the plurality of line-replaceable units comprises at least one of a network client program in communication with the network server program of said electronics box and a network server program in communication with the network client program of said electronics box.

7. The network protocol enabled in-flight entertainment system of claim 1, wherein the network server program is implemented with a Common Gateway Interface (CGI) script.

8. The network protocol enabled in-flight entertainment system of claim 1, wherein the function controlled is associated with an audio radio-frequency broadcast.

9. The network protocol enabled in-flight entertainment system of claim 1, wherein the function controlled is associated with an overhead video radio-frequency broadcast.

10. The network protocol enabled in-flight entertainment system of claim 1, wherein the function controlled is associated with an in-seat power supply.

11. The network protocol enabled in-flight entertainment system of claim 1, wherein the function controlled is associated with an in-seat audio stream.

12. The network protocol enabled in-flight entertainment system of claim 1, wherein the function controlled is associated with an in-seat video stream.

13. The network protocol enabled in-flight entertainment system of claim 1, wherein the function controlled is associated with interactive game playing.

14. The network protocol enabled in-flight entertainment system of claim 1, wherein the function controlled is associated with access to the Internet.

15. The network protocol enabled in-flight entertainment system of claim 1, wherein the function controlled is associated with an overhead reading light.

16. The network protocol enabled in-flight entertainment system of claim 1, wherein the function controlled is associated with a flight-attendant call system.

17. The network protocol enabled in-flight entertainment system of claim 1, wherein the function controlled is associated with a climate adjustment system.

18. The network protocol enabled in-flight entertainment system of claim 1, wherein the function controlled is associated with a seat adjustment system.

19. The network protocol enabled in-flight entertainment system of claim 1, wherein the function controlled is associated with a surveillance system.

20. The network protocol enabled in-flight entertainment system of claim 1, wherein the function controlled is associated with a cabin audio announcement system.

21. The network protocol enabled in-flight entertainment system of claim 1, wherein the function controlled is associated with a cabin video announcement system.

22. The network protocol enabled in-flight entertainment system of claim 1, wherein the function controlled is associated with a display of passenger flight information.

23. The network protocol enabled in-flight entertainment system of claim 1, wherein the function controlled is associated with an in-seat telephone.

24. The network protocol enabled in-flight entertainment system of claim 1, wherein the function controlled is available only to a particular group of users of the in-flight entertainment system.

25. The network protocol enabled in-flight entertainment system of claim 1:
wherein at least one of said plurality of line-replaceable units comprises a distribution device that connects the electronics box to the head-end equipment and to said at least one line-replaceable unit remote from said electronics box, said distribution device communicating signals from the electronics box to control at least one additional function on at least one of the line-replaceable units.

26. A method of performing a function of an in-flight entertainment system using network protocols, the method comprising the steps of:
providing head-end equipment, including controller equipment that control the in-flight entertainment system;
providing a plurality of line-replaceable units separate from the head-end equipment, wherein at least one line-replaceable unit of the plurality of line-replaceable units is an electronics box located at a seal, said electronics box comprising a processor, a network client program running on the processor and a network server program running on the processor
connecting the plurality of line-replaceable units wit said head-end equipment such that said network server program is operable control a hardware resource of at least one line-replaceable unit remote from said electronics box;
receiving an input signal from a user interface device connected with a line-replaceable unit of the plurality of line-replaceable units, the input signal associated with a selected function of the in-flight entertainment system,
the processor, generating a control activation signal corresponding to the input signal;
sending the control activation signal to the network client program;
generating at the network client program a network server request in a network protocol format in accordance with the control activation;
sending the network server request from the network client program to a the network server program; and
the network server program executing on said at least one line-replaceable unit remote from said electronics box an instruction for controlling a function of the in-flight entertainment system in accordance with the network server request.

27. The method of claim 26, wherein the network server request follows Hyper text Transfer Protocol.

28. The method of claim 26, wherein the network server program is implemented with a Common Gateway Interface (CGI) script.

29. The method of claim 26, wherein, in the step of executing, the function controlled is associated with an audio radio-frequency broadcast.

30. The method of claim 26, wherein, in the step of executing, the function controlled is associated with an overhead video radio-frequency broadcast.

31. The method of claim 26, wherein, in the step of executing, the function controlled is associated with an in-seat power supply.

32. The method of claim 26, wherein, in the step of executing, the function controlled is associated with an in-seat audio stream.

33. The method of claim 26, wherein, in the step of executing, the function controlled in associated with an in-seat video stream.

34. The method of claim 26, wherein, in the step of executing, the function controlled is associated with interactive game playing.

35. The method of claim 26, wherein, in the step of executing, the function controlled is associated with access to the Internet.

36. The method of claim 26, wherein, in the step of executing, the function controlled is associated with an overhead reading light.

37. The method of claim 26, wherein, in the step of executing, the function controlled is associated with a flight-attendant call system.

38. The method of claim 26, wherein, in the step of executing, the function controlled is associated with a climate adjustment system.

39. The method of claim 26, wherein, in the step of executing, the function controlled is associated with a seat adjustment system.

40. The method of claim 26, wherein, in the step of executing, the function controlled is associated with a surveillance system.

41. The method of claim 26, wherein, in the step of executing, the function controlled is associated with a cabin audio announcement system.

42. The method of claim 26, wherein, in the step of executing, the function controlled is associated with a cabin video announcement system.

43. The method of claim 26, wherein, in the step of executing, the function controlled is associated with a display of passenger flight information.

44. The method of claim 26, wherein, in the step of executing, the function controlled is associated with an in-seat telephone.

45. The method of claim 26, further comprising the steps of:
at said at least one line-replaceable unit remote from said electronics box, generating a network client response acknowledging execution of the instruction; and
said at least one line-replaceable unit remote from said electronics box sending the network client response to the network client program.

46. The method of claim 45, further comprising the steps of:
the network client program processing the network client response in order to produce a processed network client response; and
the network client program displaying the processed network client response on a display connected with said electronics box.

47. The method of claim 45, further comprising the step of:
making a particular function of the in-flight entertainment system available only to a particular group of users of the in-flight entertainment system.

48. The method of claim 26 wherein
each line-replaceable unit of the plurality comprises at least one of a client server program substantially similar to the client server program of the electronics box and a network server program substantially similar to the network server program of the electronics box.

49. A network protocol enabled in-flight entertainment system, comprising:
head-end equipment including controller equipment that control the in-flight entertainment system;
a plurality of line-replaceable units separate from the head-end equipment and coupled to the head-end equipment, at least one line-replaceable unit of the plurality of line-replaceable units being an electronics box located at a seat, said electronics box comprising:
a processor for processing an input signal generated by a user interface connected with a line-replaceable unit of the plurality of line-replaceable units, and for generating a control activation signal in response to the input signal;
a network client program running on the processor for receiving the control activation signal, and for generating a network server request in a network protocol format;
a network sewer program running on the processor for receiving the network server request, and for controlling a function of the in-flight entertainment system by executing at least one instruction on another of the line-replaceable units of the plurality of line-replaceable units that is remote from said electronics box in accordance with the received network server request; and wherein the function includes at least one of the following:
a function controlled associated with an in-seat power supply;
a function associated with an overhead reading light;
a function associated with a flight-attendant call system;
a function associated wit a climate adjustment system;
a function associated with a seat adjustment system; and
a function controlled associated with a surveillance system.

50. A method of performing a function of an in-flight entertainment system using network protocols, the method comprising the steps of:
providing head-end equipment, including controller equipment that control the in-flight entertainment system;
providing a plurality of line-replaceable units separate from the head-end equipment wherein at least one line-replaceable unit of the plurality of line-replaceable units is an electronics box located at a seat, said electronics box comprising a processor, a network client program running on the processor and a network server program running on the processor;
connecting the plurality of line-replaceable units with said head-end equipment such that said network sewer program is operable control a hardware resource of at least one line-replaceable unit remote from said electronics box
receiving an input signal from a user interface device connected with a line-replaceable unit of the plurality of line-replaceable units, the input signal associated with a selected function of the in-flight entertainment system;
the processor, generating a control activation signal corresponding to the input signal;
sending the control activation signal to the network client program;
generating at the network client program a network server request in a network protocol format in accordance with the control activation signal;
sending the network server request from the network client program to a the network server program; and
the network server program executing on said at least one line-replaceable unit remote from said electronics box an instruction for controlling a function of the in-flight entertainment system, wherein the function includes at least one of the following:
a function controlled associated with an in-seat power supply;
a function associated with an overhead reading light
a function associated with a flight-attendant call system;
a function associated with a climate adjustment system;
a function associated with a seat adjustment system; and
a function controlled associated with a surveillance system.

* * * * *

UNITED STATES PATENT AND TRADEMARK OFFICE
CERTIFICATE OF CORRECTION

PATENT NO. : 7,114,171 B2
APPLICATION NO. : 10/145464
DATED : September 26, 2006
INVENTOR(S) : Kenneth A. Brady, Jr., Dominique Van Rafelghem and Lyle K. Norton It is certified that error appears in the above-identified patent and that said Letters Patent is hereby corrected as shown below:

Column 6, line 10, "JFE" should read --IFE--.

Column 18, line 58, "CGJ" should read --CGI--.

Claim 1, Column 19, line 56, "sewer" should read -- server --.

Claim 26, Column 21, line 30, "seal" should read --seat--.

Claim 26, Column 21, line 33 "processor" should read --processor;--.

Claim 26, Column 21, line 34, "wit" should read -- with--.

Claim 26, Column 21, line 44, "system," should read --system;--.

Claim 26, Column 21, line 53, "a the network" should read --the network--.

Claim 27, Column 21, line 61, "Hyper text Transfer Protocol" should read --Hyper Text Transfer Protocol--.

Claim 33, Column 22, line 11, "in" should read --is--.

Claim 49, Column 23, line 9, "equipment" should read --equipment,--.

Claim 49, Column 23, line 25, "sewer" should read --server--.

Claim 49, Column 23, line 39, "wit" should read --with--.

Claim 50, Column 24, line 12, "sewer" should read --server--.

Claim 50, Column 24, line 15, "box" should read --box;--.

UNITED STATES PATENT AND TRADEMARK OFFICE
CERTIFICATE OF CORRECTION

PATENT NO.       : 7,114,171 B2
APPLICATION NO.  : 10/145464
DATED            : September 26, 2006
INVENTOR(S)      : Kenneth A. Brady, Jr., Dominique Van Rafelghem and Lyle K. Norton It is certified that error appears in the above-identified patent and that said Letters Patent is hereby corrected as shown below:

Claim 50, Column 24, line 29, "a the network" should read --the network--.

Claim 50 Column 24, line 37, "light" should read --light;--.

Signed and Sealed this

Twenty-sixth Day of December, 2006

JON W. DUDAS
*Director of the United States Patent and Trademark Office*